(12) United States Patent
Ogiwara et al.

(10) Patent No.: US 8,347,622 B2
(45) Date of Patent: Jan. 8, 2013

(54) MASTER CYLINDER (75) Inventors: Takato Ogiwara, Minami-Alps (JP);
Takayuki Kinoshita, Minami-Alps (JP)

(73) Assignee: Hitachi, Ltd., Tokyo (JP)

( * ) Notice: Subject to any disclaimer, the term of this patent is extended or adjusted under 35 U.S.C. 154(b) by 905 days.

(21) Appl. No.: 12/382,717

(22) Filed: Mar. 23, 2009

(65) Prior Publication Data

US 2009/0241768 A1  Oct. 1, 2009

(30) Foreign Application Priority Data

Mar. 28, 2008 (JP) .................................. 2008-085068
Dec. 19, 2008 (JP) .................................. 2008-324145

(51) Int. Cl.
*B60T 11/20* (2006.01)
(52) U.S. Cl. .......................................... 60/562; 92/135
(58) Field of Classification Search .................... 60/562; 92/130 D, 135
See application file for complete search history.

(56) References Cited

U.S. PATENT DOCUMENTS 4,510,752 A * 4/1985 Gaiser .............................. 60/562

FOREIGN PATENT DOCUMENTS

| JP | 11-43798 | 2/1999 |
| JP | 2002-104164 | 4/2002 |
| JP | 2007-176276 | 7/2007 |

* cited by examiner

*Primary Examiner* — F. Daniel Lopez
(74) *Attorney, Agent, or Firm* — Wenderoth, Lind & Ponack, LLP (57) ABSTRACT

A master cylinder includes a bottomed cylindrical cylinder body, a piston formed into a bottomed cylindrical shape by a forging method and slidably disposed in the cylinder body, and a spring assembly including a spring urging the piston toward an opening side of the cylinder body. A length of a spring of the spring assembly is determined by a retainer which can abut against an inner bottom portion of the piston. An annular groove is formed on the outermost side of the inner bottom portion of the piston by the forging method.

17 Claims, 9 Drawing Sheets

MASTER CYLINDER

BACKGROUND OF THE INVENTION

The present invention relates to a master cylinder.

A master cylinder used in, for example, a brake apparatus of a vehicle may include a bottomed cylindrical cylinder body, a piston slidable in the cylinder body, and a spring assembly urging the piston toward an opening side of the cylinder body. The piston may be formed into a bottomed cylindrical shape having a hole inside the piston, and the spring assembly may be disposed in the hole. A technique for forming a hole of such a bottomed cylindrical piston by the forging method is disclosed in, for example, Japanese Patent Public Disclosure 2002-104164.

If a hole of a piston is formed by the forging method as mentioned above, disadvantageously, an arcuate wall surface portion extending in a curved manner is generated at a joint portion between an axially extending wall portion and a bottom surface of the piston which define the hole. A retainer of a spring assembly inserted into the piston is configured to abut against the bottom surface of the piston. In the piston including the arcuate wall surface portion generated as mentioned above, a diameter of the retainer should be set such that the retainer is spaced apart from the axially extending wall portion of the piston to be prevented from resting on the arcuate wall surface portion.

In this case, however, the seating performance of the retainer may be deteriorated due to interference of the retainer with the arcuate wall surface portion on the most outer end of the bottom portion of the piston. In addition, appropriate centering of the spring assembly by the axially extending wall portion of the piston may not be achieved, whereby the spring assembly may be tilted or displaced as a whole, and the sliding performance of the piston may be adversely affected due to generation of pinching moment at the piston.

SUMMARY OF THE INVENTION

Therefore, an object of the present invention is to provide a master cylinder in which the excellent sliding performance of a piston can be securely obtained even though the piston is formed by the forging method.

To achieve the forgoing and other objects, the present invention is to provide a master cylinder in which a piston includes a preventing or limiting portion and an annular groove. The preventing portion is provided in the cylindrical portion of the piston, can abut against a retainer, and prevents or limits a movement of the retainer in a radial direction of the piston. The annular groove is formed at a bottom portion of the piston by the forging method so as to continuously extend from the preventing portion. The retainer abuts against a portion of the bottom portion other than the annular groove.

BRIEF DESCRIPTION OF THE DRAWINGS

FIG. 8(a) and FIG. 8(b) are respectively a bottom view and a sectional side view;

FIG. 12(a) and FIG. 12(b) are respectively a bottom view and a sectional side view;

DETAILED DESCRIPTION OF THE PREFERRED EMBODIMENTS

First Embodiment

A master cylinder according to a first embodiment of the present invention will now be described with reference to the accompanying drawings.

Figure 1:
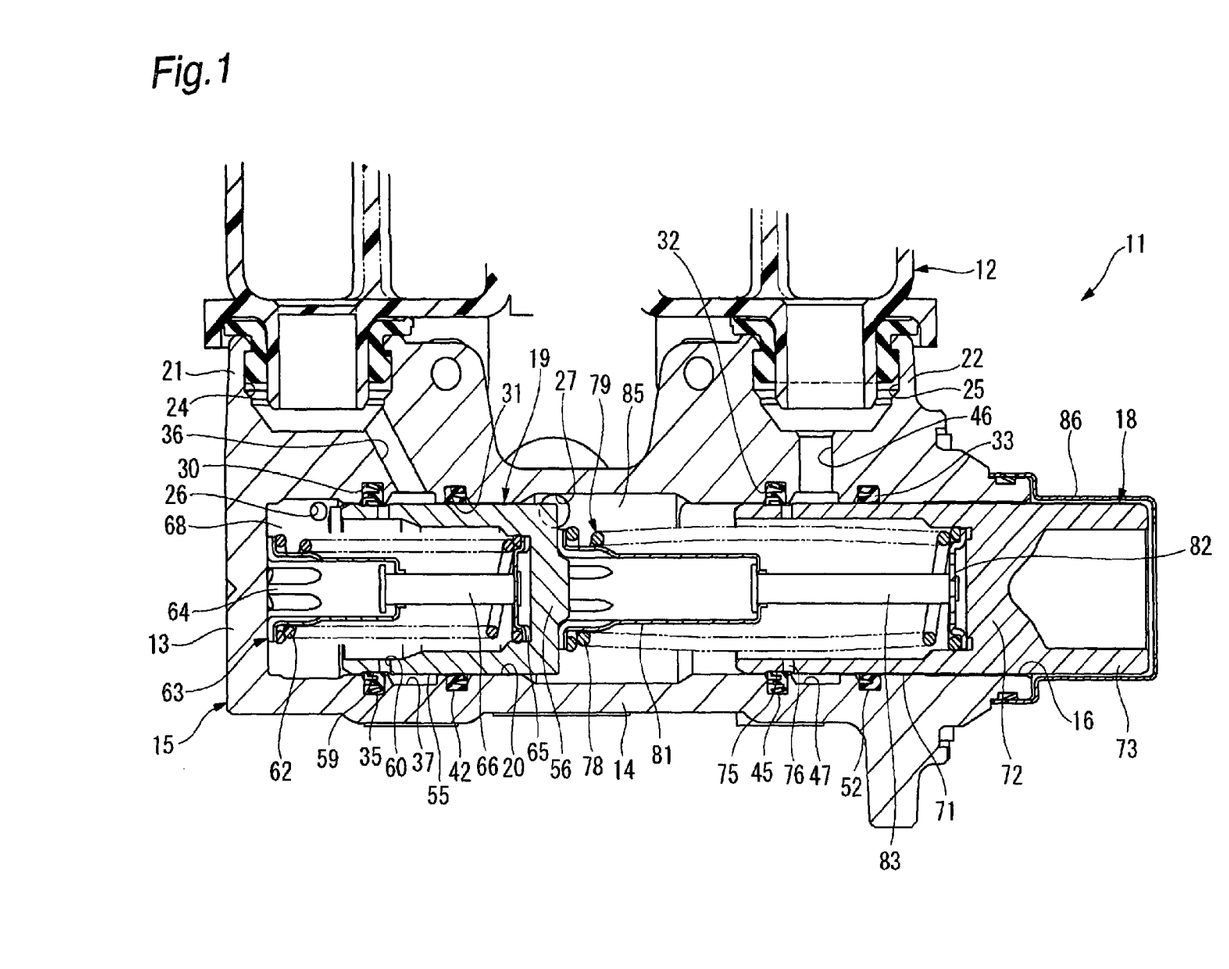
FIG. 1 is a longitudinal cross-sectional view of a master cylinder according to a first embodiment of the present invention.

In FIG. 1, reference numeral 11 denotes the master cylinder according to the first embodiment of the present invention. The maser cylinder 11 is operable to generate a brake fluid pressure by receiving a force according to an operation amount of a brake pedal which is introduced through a not-shown brake booster. A reservoir 12 for supply and discharge of brake fluid is attached to the master cylinder 11 on the gravitationally upper side of the master cylinder 11.

The master cylinder 11 is a tandem master cylinder comprising a cylinder body 15 made by processing and forming a material as one piece into a bottomed cylindrical shape having a bottom portion 13 and a cylindrical portion 14, a primary piston 18 slidably inserted so as to be located on an opening 16 side of the cylinder body 15, and a secondary piston 19 slidably inserted so as to be located on the bottom portion 13 side of the cylinder body 15 relative to the primary piston 18.

The primary piston 18 and the secondary piston 19 are slidably guided in a slide inner diameter portion 20 having a circular shape in cross section perpendicular to an axis (hereinafter referred to as "cylinder axis") of the cylindrical portion 14 of the cylinder body 15.

The cylindrical portion 14 of the cylinder body 15 includes a large diameter portion 28 having a larger diameter than that of the slide inner diameter portion 20. The large diameter portion 28 is formed on the tip side of the secondary piston 19 relative to the slide inner diameter portion 20 adapted to be fitted with the secondary piston 19 in the cylindrical portion 14.

Further, the cylindrical portion 14 of the cylinder body 15 includes a large diameter portion 29 having a larger diameter than that of the slide inner diameter portion 20. The large diameter portion 29 is formed on the tip side of the primary piston 18 relative to the slide inner diameter portion 20 adapted to be fitted with the primary piston 18 in the cylindrical portion 14.

Mounting base portions 21 and 22 are integrally formed with the cylinder body 15 at predetermined positions in the circumferential direction (hereinafter referred to as "cylinder circumferential direction") of the cylindrical portion 14 so as to protrude outwardly in the radial direction (hereinafter referred to as "cylinder radial direction") of the cylindrical portion 14. Mounting holes 24 and 25 for mounting the reservoir 12 are respectively formed at the mounting base portions 21 and 22 so as to have a same circumferential position of the cylinder circumference.

A secondary discharge passage 26 and a primary discharge passage 27 are formed on the side of the cylindrical portion 14 of the cylinder body 15 on which the mounting base portions 21 and 22 are formed. Not-shown brake pipes for supply of brake fluid into a not-shown brake apparatus are attached to the secondary discharge passage 26 and the primary discharge passage 27. The secondary discharge passage 26 and the primary discharge passage 27 are formed so as to have a same circumferential position of the cylinder circumference and have different axial positions of the cylinder axis.

A plurality of seal grooves, in particular, four seal grooves 30, 31, 32 and 33 are formed at the slide inner diameter portion 20 of the cylinder body 15, from the bottom portion 13 side to the opening 16 side in this order, so as to have different axial positions from one another on the cylinder axis. The seal grooves 30 to 33 each have an annular shape along the cylinder circumferential direction, and are outwardly concaved in the cylinder radial direction.

The seal groove 30 located on the closest position to the bottom portion 13 is formed near the mounting hole 24 on the bottom portion 13 side, and an annular cup seal 35 is fittedly contained in the seal groove 30.

An annular opening groove 37 is formed on the opening 16 side relative to the seal groove 30 in the cylinder body 15 so as to be concaved from the slide inner diameter portion 20 of the cylindrical portion 14 outwardly in the cylinder radial direction. A communication hole 36 is formed through the cylinder body 15 so as to connect the mounting hole 24 on the bottom portion 13 side and the inside of the cylindrical portion 14 via the opening groove 37. The opening groove 37 and the communication hole 36 are constantly in communication with the reservoir 12, and communicably connect the inside of the cylindrical portion 14 and the reservoir 12.

In the cylinder body 15, the above-mentioned seal groove 31 is formed on the opposite side, i.e., the opening portion 16 side of the opening groove 37 from the seal groove 30 in the cylinder axial direction. An annular defining seal 42 is fitted in the seal groove 31.

The above-mentioned seal groove 32 is formed on the opening portion 16 side of the cylinder body 15 relative to the seal groove 31 and near the mounting hole 25 on the opening portion 16 side. An annular cup seal 45 (seal) is fitted in the seal groove 32.

An annular opening groove 47 is formed on the opening 16 side relative to the seal groove 32 in the cylinder body 15 so as to be concaved from the slide inner diameter portion 20 of the cylindrical portion 14 outwardly in the cylinder radial direction. A communication hole 46 is formed through the cylinder body 15 so as to connect the mounting hole 25 on the opening portion 16 side and the inside of the cylindrical portion 14 via the opening groove 47. The opening groove 47 and the communication hole 46 are constantly in communication with the reservoir 12, and communicably connect the inside of the cylindrical portion 14 and the reservoir 12.

In the cylinder body 15, the above-mentioned seal groove 33 is formed the opposite side, i.e., the opening portion 16 side of the opening groove 47 from the seal groove 32 in the cylinder body 15. An annular defining seal 52 is fittedly contained in the seal groove 33.

The secondary piston 19 fitted on the bottom portion 13 side of the cylinder body 15 has a bottomed cylindrical shape (cup shape) comprising a cylindrical portion 55 and a bottom portion 56 formed on one side of the cylindrical portion 55 in the axial direction. The secondary piston 19 is slidably fitted to the slide inner diameter portion 20 of the cylinder body 15 while the cylindrical portion 55 is located on the bottom portion 13 side of the cylinder body 15. An annular stepped portion 59 having a slightly smaller diameter than the other portions is formed on the outer surface of the cylindrical portion 55 on the opposite end of the cylindrical portion 55 from the bottom portion 56. A plurality of ports 60 are radially formed at the stepped portion 59 on the bottom portion 56 side of the stepped portion 59 so as to penetrate through the cylindrical portion 55 in the cylinder radial direction.

A spring assembly 63 is disposed between the secondary piston 19 and the bottom portion 13 of the cylinder body 15 so that the spring assembly 63 is inserted in the cylindrical portion 55. The spring assembly 63 includes a secondary piston spring 62 which urges the secondary piston 19 toward the opening portion 16 side of the cylinder body 15 when the secondary piston spring is in a compressed state.

The spring assembly 63 comprises an axially long retainer 64 abutting against the bottom portion 13 of the cylinder body 15, an axially short retainer 65 abutting against the bottom portion 56 of the secondary piston 19, and an shaft member 66 supporting the short retainer 65 and the long retainer 64. The shaft member 66 has one end fixed to the short retainer 65, and the other end supporting the long retainer 64 so that the retainer 64 can slide only within a predetermined range. In this way, the retainers 64 and 65 are relatively movably coupled with each other by the shaft member 66. The secondary piston spring 62 is disposed between the retainers 64 and 65 relatively movably coupled with each other while the extension length of the spring 62 is determined by the retainers 64 and 65. The distance between the secondary piston 19 and the bottom portion 13 of the cylinder body 15 is determined by the spring assembly 63 when the master cylinder is in the initial state with no input from the not-shown brake pedal side (right side as viewed in FIG. 1).

The cup seal 35 and the defining seal 42 abut against the outer surface of the secondary piston 19. The space defined by the bottom portion 13 of the cylinder body 15, the bottom portion 13 side of the cylindrical portion 14, and the secondary piston 19 is sealed by the cup seal 35, so as to serve as a secondary pressure chamber 68 which supplies a fluid pressure to the secondary discharge passage 26.

The secondary pressure chamber 68 is in communication with the reservoir 12 when the secondary piston 19 is at a position causing the port 60 to become open to the opening groove 37. On the other hand, the inner surface of the cup seal 35 disposed in the seal groove 30 on the bottom portion 13 side of the cylinder body 15 is in sliding contact with the outer surface of the secondary piston 19. The communication between the reservoir 12 and the secondary pressure chamber 68 can be cut off when the secondary piston 19 is at a position causing the port 60 to be located on the bottom portion 13 side relative to the cup seal 35. When the secondary piston 19 moves to the bottom portion 13 side by sliding on the inner surface of the slide inner diameter portion 20, the inner surface of the cup seal 35 retained in the cylinder body 15, and the inner surface of the defining seal 42, the brake fluid in the secondary pressure chamber 68 is pressurized and is supplied through the secondary discharge passage 26 to the brake apparatus.

The primary piston 18 is fitted to the opening portion 16 side of the cylinder body 15. The primary piston 18 comprises an inner-side cylindrical portion 71 (cylindrical portion), a bottom portion 72 formed on one side of the inner-side cylindrical portion 72 in the axial direction, and an outer-side cylindrical portion 73 formed on the opposite side of the bottom portion 72 from the inner-side cylindrical portion 71. The primary piston 18 is inserted in the cylinder body 15 with the inner-side cylindrical portion 71 located on the secondary piston 19 side in the cylinder body 15. A not-shown output shaft of the brake booster is inserted inside the outer-side cylindrical portion 73, and the bottom portion 72 is pushed by the output shaft.

An annular concave portion 75 having a slightly smaller diameter than that of the other portions is formed on the outer surface of the opposite end of the inner-side cylindrical portion 71 from the bottom portion 72. Further, a plurality of ports 76 are radially formed at the concave portion 75 of the inner-side cylindrical portion 71 on the bottom portion 72 side of the concave portion 75 so as to radially penetrate the inner-side cylindrical portion 71.

A spring assembly 79 is disposed between the secondary piston 19 and the primary piston 18. The spring assembly 79 is partially inserted in the inner-side cylindrical portion 71. The spring assembly 79 comprises a primary piston spring 78 (spring), which urges the primary piston 18 toward the opening portion 16 side of the cylinder body 15 when the spring 78 is in a compressed state. The spring assembly 79 comprises an axially long retainer 81 abutting against the bottom portion 56 of the secondary piston 19, an axially short retainer 82 abutting against the bottom portion 72 of the primary piston 18, and a shaft member 83 supporting the long retainer 81 and the short retainer 82. The shaft member 83 has one end fixed to the retainer 82 and the other end supporting the retainer 81 so that the retainer 81 can slide only within a predetermined range. In this way, the retainers 81 and 82 are relatively movably coupled with each other by the shaft member 83. The primary piston spring 78 is disposed between the retainers 81 and 82 while the length of the spring 78 is determined by the retainers 81 and 82. The distance between the secondary piston 19 and the primary piston 18 is determined by the spring assembly 79 when the master cylinder is in the initial state with no input from the not-shown brake pedal side (right side as viewed in FIG. 1).

The cup seal 45 and the defining seal 52 abut against the outer surface of the primary piston 18. The space defined by the open portion 16 side of the cylindrical portion 14 of the cylinder body 15, the primary piston 18, and the secondary piston 19 serves as a primary pressure chamber 85 (pressure chamber) for supply of a fluid pressure to the primary discharge passage 27. The primary pressure chamber 85 is in communication with the reservoir 12 when the primary piston 18 is at a position causing the port 76 to become open to the opening groove 47. On the other hand, the inner surface of the cup seal 45 disposed in the seal groove 32 of the cylinder body 15 abuts against the outer surface of the primary piston 18. Therefore, the communication between the reservoir 12 and the primary pressure chamber 85 can be cut off when the primary piston 18 is at a position causing the port 76 to be located on the bottom portion 13 side relative to the cup seal 45. When the primary piston 18 moves to the bottom portion 13 side by sliding on the inner surfaces of the slide inner diameter portion 20 of the cylinder body 15, the cup seal 45 retained in the cylinder body 15, and the defining seal 52, the brake fluid in the primary pressure chamber 85 is pressurized and supplied through the primary discharge passage 27 into the brake apparatus.

A cover 86 is attached to the opening portion 16 side of the cylinder body 15 so as to cover the primary piston 18 protruding from the opening portion 16.

Figure 2:
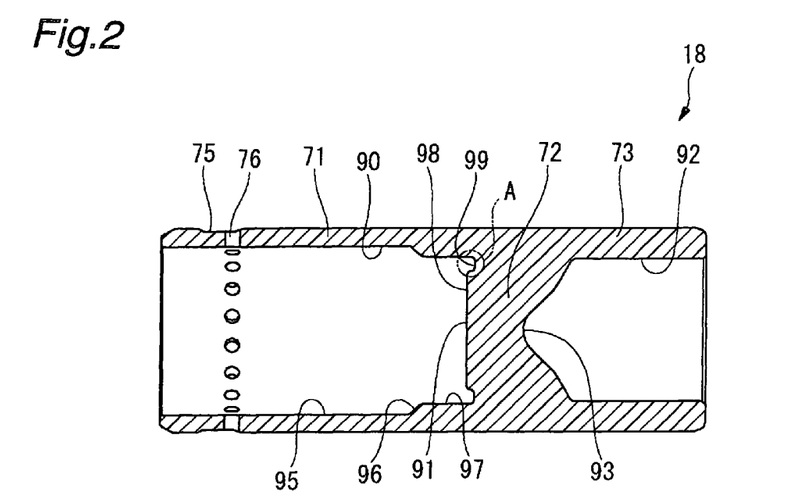
FIG. 2 is a longitudinal cross-sectional view of a primary piston of the master cylinder according to the first embodiment of the present invention.

The above-mentioned primary piston 18 shown in FIG. 2 is formed by the forging method so as to include an inner wall portion 90 on the inner surface side of the inner-side cylindrical portion 71, an inner bottom portion 91 on the inner-side cylindrical portion 71 side of the bottom portion 72, an inner wall portion 92 on the inner surface side of the outer-side cylindrical portion 73, and an inner bottom portion 93 on the outer-side cylindrical portion 73 side of the bottom portion 72.

An inner wall surface portion 95 having a certain diameter is formed at the inner wall portion 90 on the inner surface side of the inner-side cylindrical portion 71 on the opposite side of the inner wall portion 90 from the inner bottom portion 91. A taper surface portion 96 is formed on the inner bottom portion 91 side of the inner wall surface portion 95. An inner wall surface portion 97 (inner circumferential surface) having a certain diameter smaller than that of the inner wall surface portion 95 is formed on the inner bottom portion 91 side of the taper surface portion 96. The diameter of the inner wall surface portion 97 is the smallest, but slightly larger than that of the retainer 82 so that the retainer 82 of the spring assembly 79 can be inserted therein while centering of the retainer 82 is performed. The outer surface of the end of the primary piston spring 78 is tightly fitted to the inner wall surface portion 97. As a result, the primary piston spring 78 and the spring assembly 79 are fixed to the primary piston 18. Further, the inner bottom portion 91 includes a plane portion 98 extending perpendicularly to the axis of the primary piston 18. In the present embodiment, the inner wall surface portion 97 constitutes a limiting portion for limiting a movement of the retainer in the radial direction of the piston.

Figure 3:
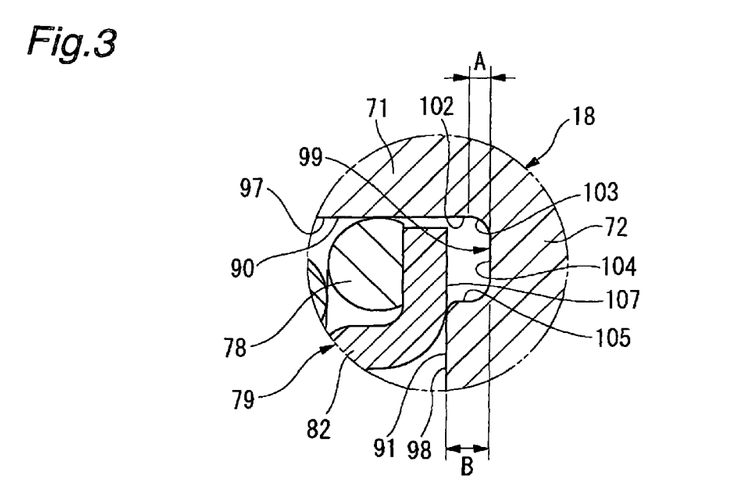
FIG. 3 is an expanded sectional view of portion A shown in FIG. 2, illustrating the master cylinder according to the first embodiment of the present invention.

An annular groove 99 is formed on the most outer side of the inner bottom portion 91 of the primary piston 18 by the forging method so as to be concaved toward the outer-side cylindrical portion 73 side. As shown in FIG. 3, the annular groove 99 comprises a wall surface portion 102 having the same certain diameter as the diameter of the inner wall surface portion 97 and continuously extending from the inner wall surface portion 97. The annular groove 99 further comprises an arcuate wall surface portion 103 located on the opposite side of the wall surface portion 102 from the inner wall surface portion 97. The arcuate wall surface portion 103 has an arcuate shape in cross section along the axial direction of the primary piston 18. As viewed in FIG. 3, a radius of the arcuate shape of the arcuate wall surface portion 103 decreases in proportion to an increase in the distance from the inner wall surface portion 97. The annular groove 99 further comprises an annular groove bottom surface portion 104 extending from the opposite side of the arcuate wall surface portion 103 from the wall surface portion 102, and extending inwardly perpendicularly to the axis of the primary piston 18. The annular groove 99 further comprises a wall surface portion 105 extending from the inner side of the groove bottom surface portion 104 toward the inner-side cylindrical portion 71 side, forming an arc of a circle having a certain diameter. The wall surface portion 105 is connected to the plane portion 98 of the inner bottom portion 91.

In the drawings, reference numeral A denotes the distance along the longitudinal direction of the primary piston 18 from the opposite end of the arcuate wall surface portion 103 from the groove bottom surface portion 104, to the groove bottom surface portion 104. Reference numeral B denotes the distance along the longitudinal direction of the primary piston 18 from the opposite end of the wall surface portion 105 from the groove bottom surface portion 104, to the groove bottom surface portion 104 (i.e., the distance from the groove bottom surface portion 104 to the plane portion 98). The distance A is shorter than the distance B. In the present embodiment, the distance B is set to around 1 mm, and the distance A is set to less than 1 mm. Further, in the present embodiment, the distance from the wall surface portion 102 to the wall surface portion 105 is set to around 2 mm. On the other hand, the retainer 82 includes a flat end surface portion 107 (plane portion) extending perpendicularly to the axis on the opposite side of the retainer 82 from the primary piston spring 78. The end surface portion 107 has an inner diameter smaller than the outer diameter of the plane portion 98. Further, a space having a dimension smaller than half the wire diameter of the primary piston spring 78 is generated between the outer circumferential surface of the end surface portion 107 and the inner wall surface portion 97. As a result, while centering of the outer surface side of the retainer 82 is performed by the inner wall surface portion 97, the end surface portion 107 of the retainer 82 abuts against the plane portion 98 formed on the inner circumferential side relative to the annular groove 99 of the inner bottom portion 91.

According to the above-mentioned master cylinder 11 of the first embodiment, the annular groove 99 is formed by the forging method on the most outer side of the inner bottom portion 91 of the primary piston 18, and therefore the arcuate wall surface portion 103 is formed by the forging method on the most outer side of the annular groove 99. As a result, the arcuate wall surface portion 103 can be located on the deeper side compared to the plane portion 98 of the inner bottom portion 91 which serves as a seat face of the retainer 82, in the longitudinal direction of the primary piston 18. Therefore, even through the primary piston 18 is formed by the forging method, it is possible to prevent interference of the retainer 82 of the spring assembly 79 with the most outer side of the inner bottom portion 91, and therefore possible to improve the seating performance of the retainer 82. Furthermore, it is possible to keep an appropriate erecting position of the spring assembly 79, and securely obtain the excellent sliding performance of the primary piston 18. As a result, a driver can have excellent brake operation feeling. In addition, since the sliding performance is improved, it is possible to reduce damage to the primary piston 18 due to pinching.

Furthermore, the retainer 82 of the spring assembly 79 abuts against the plane portion 98 formed on the inner circumferential side relative to the annular groove 99 of the inner bottom portion 91 of the primary piston 18. Therefore, it is possible to securely prevent interference of the retainer 82 of the spring assembly 79 with the most outer side of the inner bottom portion 91 of the primary piston 18, and thereby possible to obtain the excellent sliding performance of the primary piston 18.

The shape of the annular groove 99 is not limited to the above mentioned shape, and may be conveniently changed according to a shape of a forging die. Any shape may be employed which can improve the seating performance of the retainer 82 of the spring assembly 79

Figure 4:
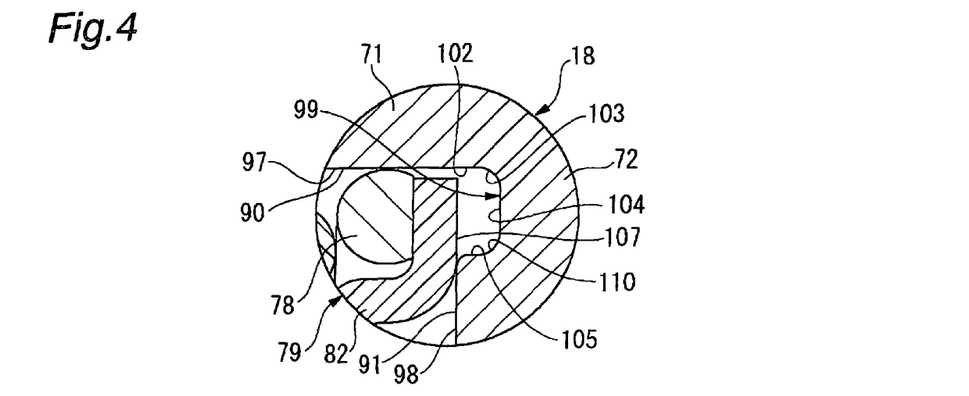
FIG. 4 is an expanded sectional view of portion A shown in FIG. 2, illustrating a variation of the master cylinder according to the first embodiment of the present invention.

For example, as shown in FIG. 4, an arcuate wall surface portion 110 may be formed between the groove bottom surface portion 104 and the wall surface portion 105. The arcuate wall surface portion 110 has an arcuate shape in cross section along the axial direction of the primary piston 18. A radius of the arcuate shape of the arcuate wall surface portion 110 may decrease in proportion to an increase in the distance from the groove bottom surface portion 104.

Figure 5:
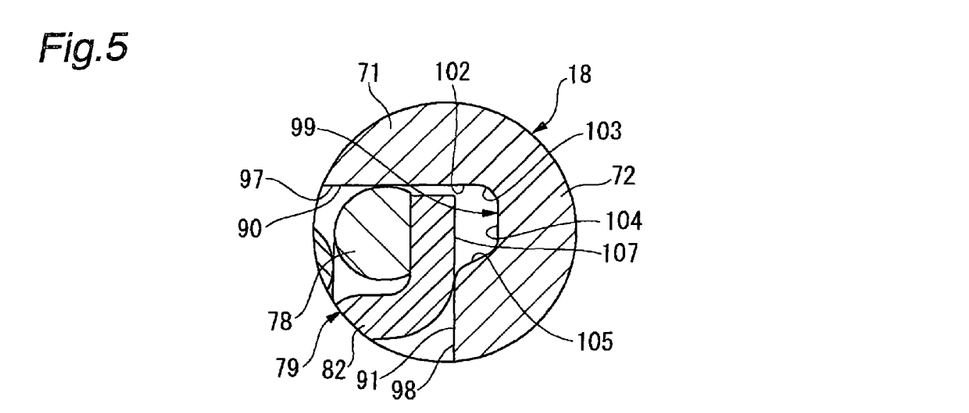
FIG. 5 is an expanded sectional view of portion A shown in FIG. 2, illustrating another variation of the master cylinder according to the first embodiment of the present invention.

Further, as shown in FIG. 5, the wall surface portion 105 may have a taper shape tapering from the groove bottom surface portion 104. A radius or diameter of the taper shape may decrease in proportion to an increase in the distance from the groove bottom surface portion 104.

Figure 6:
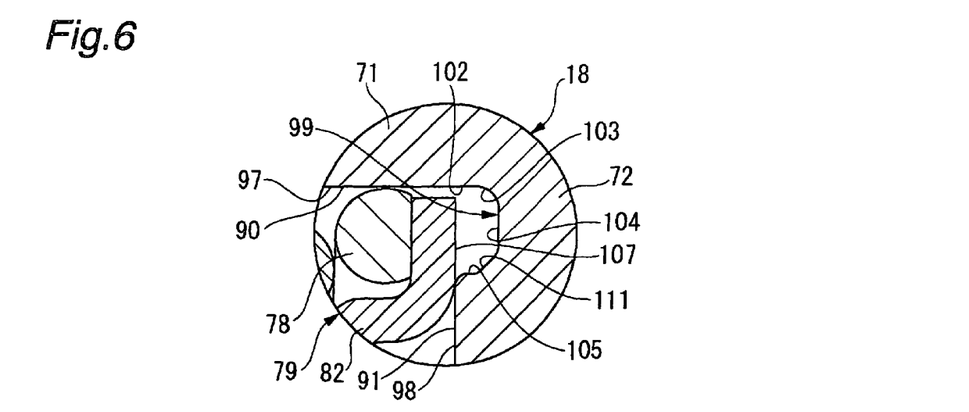
FIG. 6 is an expanded sectional view of portion A shown in FIG. 2, illustrating still another variation of the master cylinder according to the first embodiment of the present invention.

Further, as shown in FIG. 6, a taper surface portion 111 may be formed between the groove bottom surface portion 104 and the wall surface portion 105. The taper surface portion 111 has a taper shape tapering from the groove bottom surface portion 104. A radius of the taper surface portion 111 may decrease in proportion to an increase in the distance from the groove bottom surface portion 104.

Second Embodiment

A master cylinder according to a second embodiment of the present invention will now be described with reference to FIGS. 7 to 10. In particular, difference from the first embodiment will be explained in detail. In the following description, like components are denoted by like reference numerals as of the first embodiment, and the detailed description thereof will not be repeated for the sake of brevity.

Figure 7:
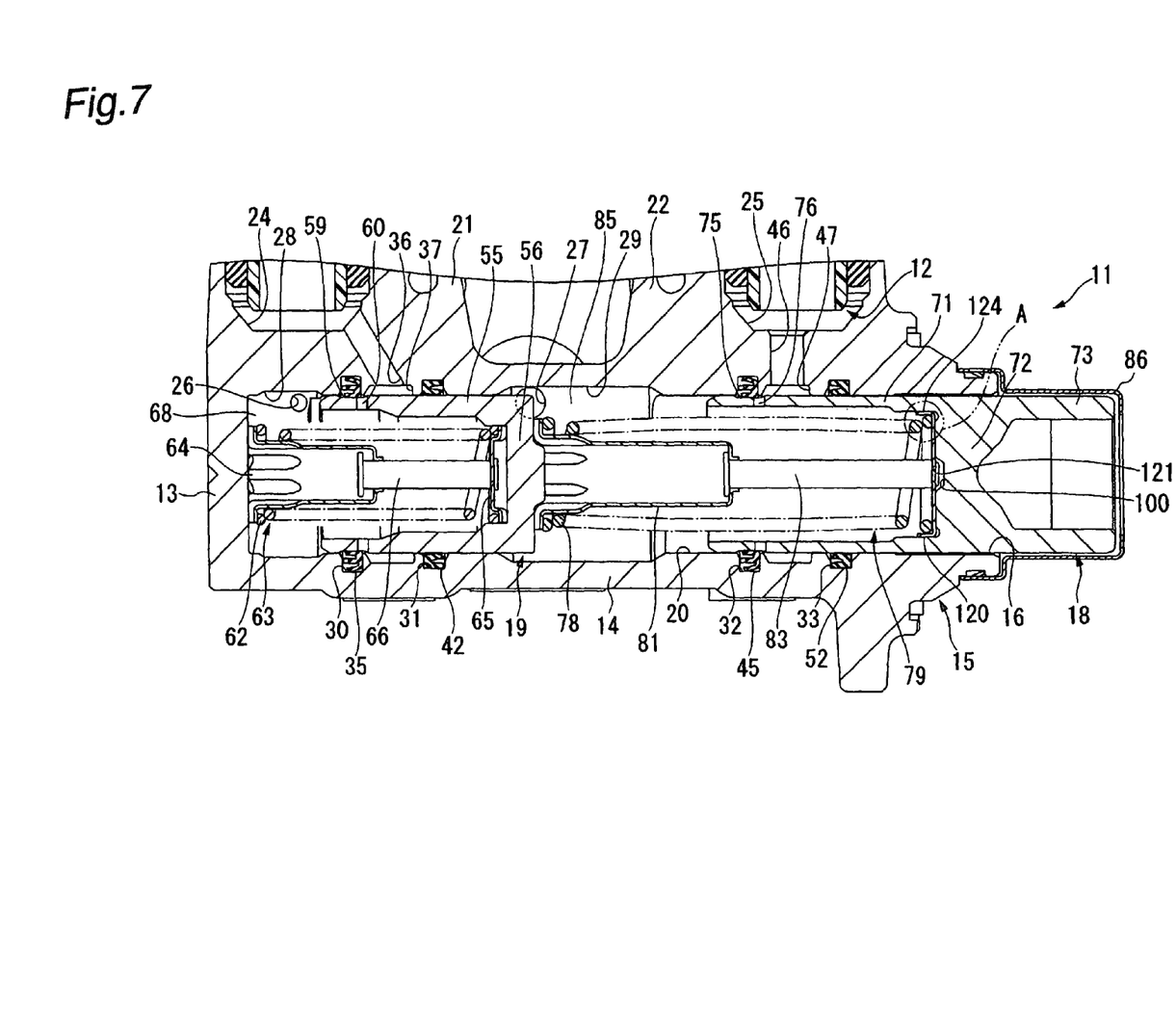
FIG. 7 is a longitudinal cross-sectional view of a master cylinder according to a second embodiment of the present invention.

In the second embodiment, as shown in FIG. 7, the shape of the primary piston 18 is partially different from that in the first embodiment, and the spring assembly 79 pushing the primary piston 18 is different from that in the first embodiment.

The spring assembly 79 of the second embodiment is partially contained in the inner-side cylindrical portion 71 of the primary piston 18. The spring assembly 79 includes a retainer 120 at the end of the portion contained in the inner-side cylindrical portion 71.

Figure 8:
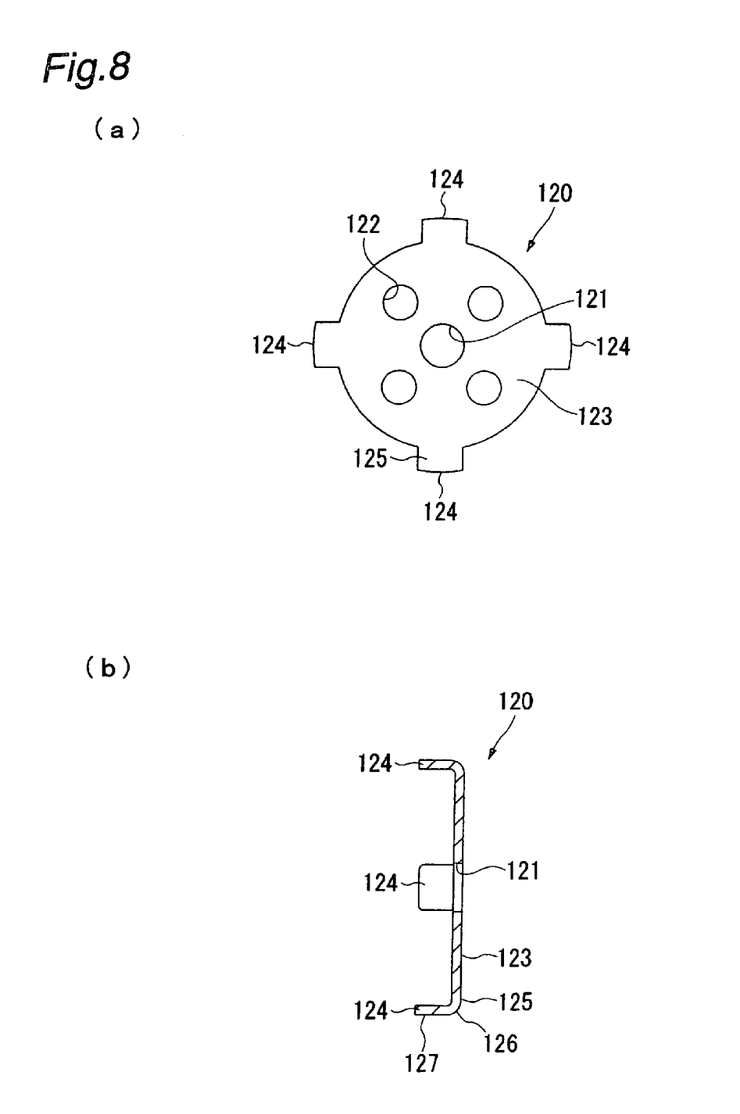
FIG. 8 illustrates a retainer of the master cylinder according to the second embodiment of the present invention, and in particular.

As shown in FIG. 8, the retainer 120 includes a flat plate disk portion 123 and engagement piece portions 124.

The flat plate disk portion 123 includes a connection hole 121 formed at the center thereof. The connection hole axially extends through the disk portion 123. The disk portion 123 further includes a plurality of surrounding holes 122 (four holes) formed around the connection hole 121. The surrounding holes 122 axially extend through the disk portion 123.

The plurality of engagement piece portions 124 (four piece portions) are equiangularly formed along the outer circumferential edge of the disk portion 123. The respective engagement piece portions 124 radially outwardly protrude beyond the outer circumference of the disk portion 123, and also extend along the axial direction.

More specifically, the engagement piece portion 124 comprises a radially protruding portion 125 disposed on the same surface as the disk portion 123, and a curved portion 126 bent from the outer end of the radially protruding portion 125 so as to be axially oriented, and an axially protruding portion 127 axially protruding from the opposite end of the curved portion 126 from the radially protruding portion 125. As shown in FIG. 7, the shaft member 83 is inserted through the connection hole 121, whereby the retainer 120 is coupled with the shaft member 83. The end of the primary piston spring 78 is engaged by the insides of the plurality of engagement piece portions 124.

Figure 9:
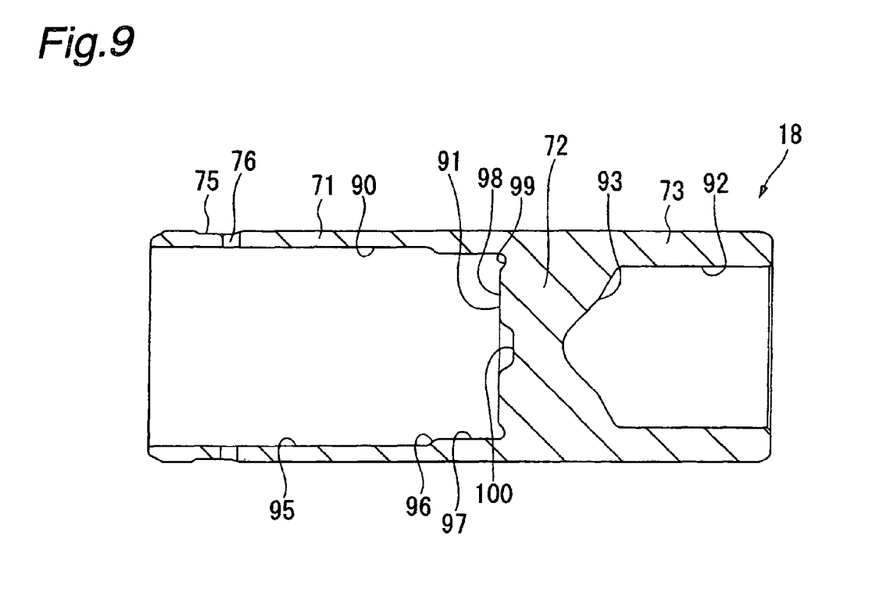
FIG. 9 is a longitudinal cross-sectional view of a primary piston of the master cylinder according to the second embodiment of the present invention.

As shown in FIG. 9, the primary piston 18 disposed in the opening portion 16 side of the cylinder body 15 includes the inner wall portion 90 on the inner surface side of the inner-side cylindrical portion 71, the inner bottom portion 91 of the bottom portion 72 on the side of the inner-side cylindrical portion 71, the inner wall portion 92 on the inner surface side of the outer-side cylindrical portion 73, and the inner bottom portion 93 of the bottom portion 72 of the side of the outer-side cylindrical portion 73. The primary piston 18 is formed to have this configuration by the forging method. That is, the primary piston 18 is formed into a bottomed cylindrical shape by the forging method.

The inner-side cylindrical portion 71 has the inner wall portion 90 forming the inner circumferential surface of the portion 71. The inner wall portion 90 has the cylindrical inner wall surface portion 95 having a certain diameter on the opposite side from the inner bottom portion 91. The inner wall surface portion 95 extends along the axial direction of the primary piston 18. The taper surface portion 96 is formed on the inner bottom portion 91 side of the inner wall surface portion 95, so as to taper from the inner wall surface portion 95 side to the inner bottom portion 91 side. A radius or diameter of the taper surface portion 96 decreases in proportion to an increase in the distance from the inner wall surface portion 95. The taper surface portion 96 includes the cylindrical inner wall surface portion 97 on the inner bottom portion 91 side. The inner wall surface portion 97 has a certain diameter smaller than that of the inner wall surface portion 95, and extends along the axial direction of the primary piston 18.

The inner bottom portion 91 includes the plane portion 98 formed perpendicularly to the axis of the primary piston 18. A concave portion 100 axially concaved from the plane portion 98 is formed at the center of the plane portion 98. As shown in FIG. 7, the concave portion 100 receives a protruding portion of the shaft member 83 from the retainer 120.

As shown in FIG. 9, the annular groove 99 is formed on the outer circumferential end of the inner bottom portion 91 of the primary piston 18 by the forging method so as to be concaved toward the side of the outer-side cylindrical portion 73 in the axial direction of the primary piston 18.

Figure 10:
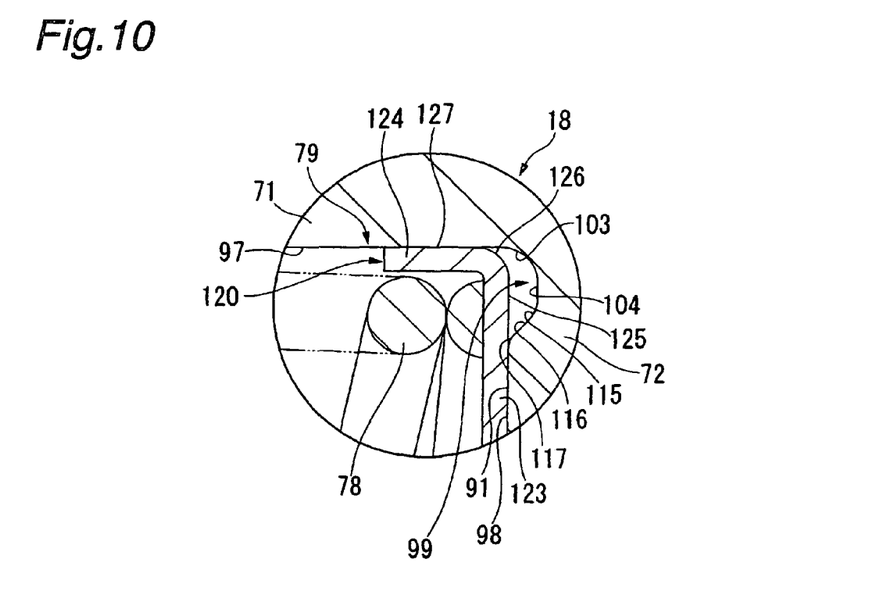
FIG. 10 is an expanded sectional view of essential portion A shown in FIG. 7, illustrating the master cylinder according to the second embodiment of the present invention.

As shown in FIG. 10, the annular groove 99 includes the arcuate wall surface portion 103 and the annular flat groove bottom surface portion 104. The arcuate wall surface portion 103 is adjacent to the inner wall surface portion 97. A radius of the arc of the arcuate wall surface portion 103 decreases in proportion to an increase in the distance toward the axis of the primary piston 18 from the inner wall surface portion 97. In this way, the arcuate wall surface portion 103 has an arcuate shape in cross section along the axial direction of the primary piston 18. The groove bottom surface portion 104 is adjacent to the opposite side of the arcuate wall surface portion 103 from the inner wall surface portion 97, and extends from the arcuate wall surface portion 103 inwardly perpendicularly to the axis of the primary piston 18.

The annular groove 99 further includes an arcuate wall surface portion 115, a taper surface portion 116, and an arcuate corner portion 117. The arcuate wall surface portion 115 is adjacent to the inner side of the groove bottom surface portion 104, and extends toward the plane portion 98 side so as to have an arcuate shape in cross section along the axial direction of the primary piston 18. The taper surface portion 116 is adjacent to the opposite side of the arcuate wall surface portion 115 from the groove bottom surface portion 104, and tapers toward the plane 98 side. The arcuate corner portion 117 is adjacent to the opposite side of the taper surface portion 116 from the arcuate wall surface portion 115, and extends toward the plane 98 side so as to have an arcuate shape in cross section along the axial direction of the primary piston 18. The plane portion 98 is adjacent to the opposite side of the arcuate corner portion 117 from the taper surface portion 116. The arcuate wall surface portion 103 is formed so as to draw an arc of a circle having a larger diameter than that of the curved portion 126 of the retainer 120 in cross section along the axial direction.

In the retainer 120 of the spring assembly 79 received in the inner-side cylindrical portion 71, when the retainer 120 is fitted into the inner wall surface portion 97, all of the engagement piece portions 124 simultaneously radially abut against the inner wall surface portion 97. As a result, radial movement of the retainer 120, i.e., movement of the retainer 120 in the radial direction of the primary piston 18 is prevented, so that the retainer 120 is fixed in the primary piston 18.

That is, when the retainer 120 is fitted to the primary piston 18, the disk portion 123 abuts against the plane portion 98 on the inner circumferential side relative to the annular groove 99 of the inner bottom portion 91, and the axially protruding portions 127 of the plurality of engagement piece portions 124 on the outer circumferential end abut the inner wall surface portion 97.

In the present embodiment, the inner wall surface portion 97 constitutes a limiting portion for limiting a movement of the retainer in the radial direction of the piston.

The depth of the annular groove 99 on the outer circumferential end of the inner bottom portion 91 is set such that the arcuate wall surface portion 103 at the most outer end of the inner bottom portion 91 does not interfere with the retainer 120, and the disk portion 123 of the retainer 120 can abut against the plane portion 98. In this way, it is possible to prevent interference of the arcuate wall surface portion 103 with the retainer 120 which could otherwise occur when the inner bottom portion 91 is made by the forging method.

In particular, the depth of the annular groove 99 is set such that the arcuate wall surface portion 103 is overall located on an axially deeper side than the plane portion 98 of the primary piston 18. In other word, the depth of the annular groove 99 is set such that the distance in the axial direction of the primary piston 18 between the starting point of the arcuate wall surface portion 103 on the inner wall surface 97 side and the plane portion 98 is 0 or more.

Further, as mentioned above, the arcuate wall surface portion 103 is formed so as to draw an arc of a circle having a larger diameter than that of the curved portion 126 of the retainer 120 in cross section along the axial direction.

As a result, without interference of the arcuate wall surface portion 103, while centering of the outer side of the retainer 120 is performed with the aid of the inner wall surface portion 97, the disk portion 123 of the retainer 120 abuts against the plane portion 98 formed inner circumferential side relative to the annular groove 99 of the inner bottom portion 91.

According to the master cylinder 11 of the second embodiment as mentioned above, the annular groove 99 is formed by the forging method at the outer circumferential end of the inner bottom portion 91 of the primary piston 18 so as to be continuously connected with the inner wall surface portion 97 against which the outer circumferential end of the retainer 120 abuts. Therefore, the arcuate wall surface portion 103 is formed on the most outer end of the annular groove 99 by the forging method, and the arcuate wall surface portion 103 can be located at the deeper side than the plane portion 98 of the inner bottom portion 91 on which the retainer 120 is seated. Therefore, it is possible to prevent interference of the retainer 120 of the spring assembly 79 with the most outer end of the inner bottom portion 91 even though the primary piston 18 is made by the forging method, and therefore possible to improve the seating performance of the retainer 120. As a result, it is possible to keep an appropriate erecting position of the spring assembly 79, and securely obtain the excellent sliding performance of the primary piston 18. Further, due to improvement of the sliding performance, it is possible to reduce damage to the primary piston 18 caused by pinching. Furthermore, since it is possible to prevent tilt of the spring assembly 79 in the axial direction of the primary piston 18, it is possible to prevent tilt of the secondary piston 19, against which the spring assembly 79 abuts, in the axial direction of the cylinder body 15. Therefore it is possible to keep an appropriate erecting position of the secondary piston 19, and securely obtain the excellent sliding performance of the secondary piston 19.

The shape of the annular groove 99 may be any shape capable of improving the seating performance of the retainer 120 of the spring assembly 79, and may be conveniently changed according to a shape of a forging die. In the present embodiment, the annular groove 99 is formed at the primary piston 18, but it may be formed at the secondary piston 19.

Third Embodiment

A master cylinder according to a third embodiment of the present invention will now be described, mainly referring to FIGS. 11 to 14. In particular, difference from the first embodiment will be explained in detail. In the following description, like components are denoted by like reference numerals as of the first embodiment, and the detailed description thereof will not be repeated for the sake of brevity.

Figure 11:
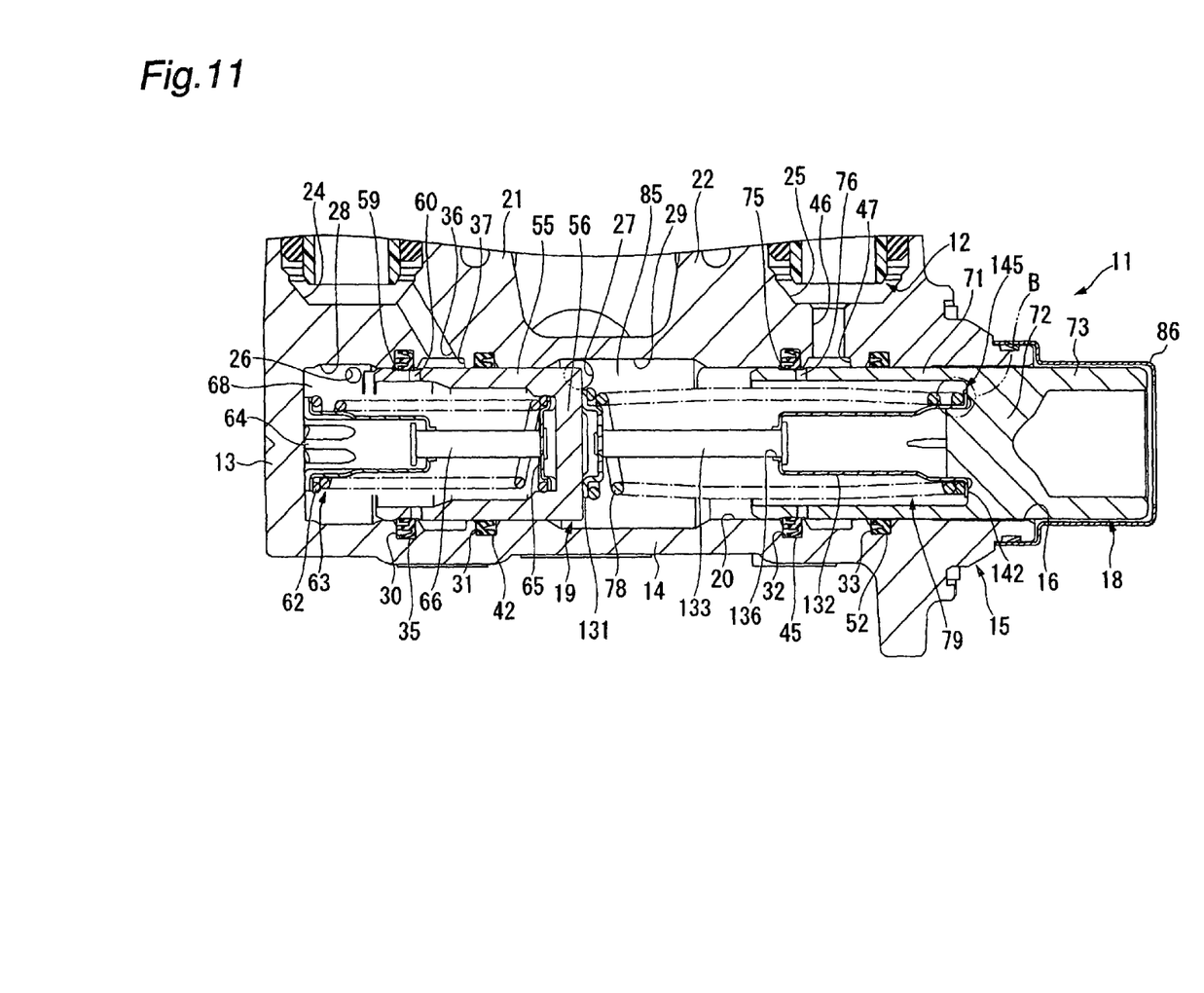
FIG. 11 is a longitudinal cross-sectional view of a master cylinder according to a third embodiment of the present invention.

In the third embodiment, as shown in FIG. 11, the shape of the primary piston 18 is partially different from those in the first and second embodiments, and the spring assembly 79 pushing the primary piston 18 is different from those in the first and second embodiments.

The spring assembly 79 of the third embodiment includes an axially short retainer 131 abutting against the bottom portion 56 of the secondary piston 19, an axially long retainer 132 abutting against the bottom portion 72 of the primary piston 18, and a shaft member 133 having one end fixed to the short retainer 131 and supporting the long retainer 132 so that the retainer can slide only within a predetermined range. The spring assembly 79 of the third embodiment includes the primary piston spring 78. The primary piston spring 78 is disposed between the retainers 131 and 132, and its extension length is determined by the retainers 131 and 132.

The spring assembly 79 of the third embodiment is partially received in the inner-side cylindrical portion 71 of the primary piston 18. The spring assembly 79 has the retainer 132 at the end of the portion thereof received in the inner-side cylindrical portion 71.

Figure 12:
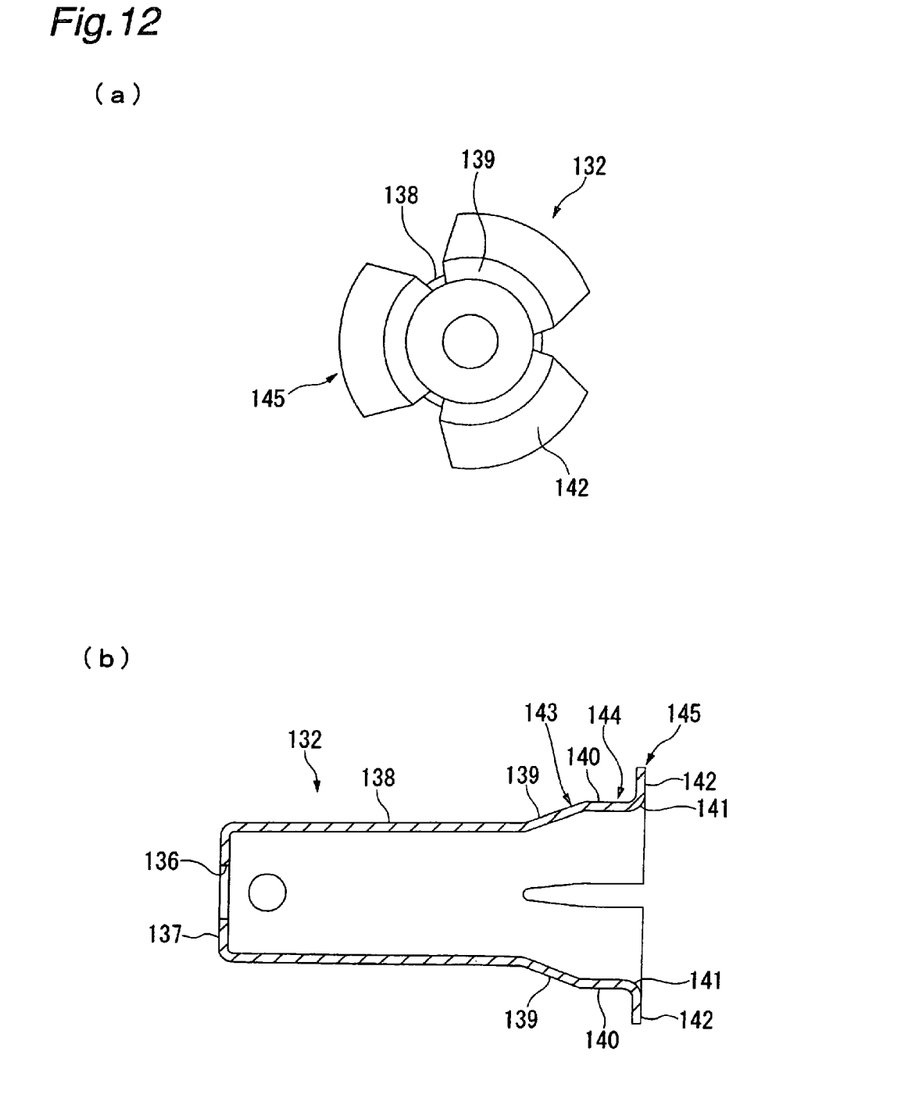
FIG. 12 illustrates a retainer of the master cylinder according to the third embodiment of the present invention, and in particular.

As shown in FIG. 12, the retainer 132 includes a flat bottom plate portion 137 having an axially penetrating connection hole 136 at the center thereof, a cylindrical body portion 138 axially extending from the outer circumferential edge of the bottom plate portion 137, a plurality of taper piece portions 139 (three taper piece portions 139) circumferentially equiangularly extending from the opposite end of the body portion 138 from the bottom plate portion 137, cylindrical piece portions 140 axially extending from the opposite ends of the respective taper piece portions 139 from the body portion 138, curved piece portions 141 curved from the opposite ends of the respective cylindrical piece portions 140 from the taper piece portions 139 and oriented outwardly perpendicularly to the axis, and engagement piece portions 142 extending outwardly perpendicularly to the axis from the opposite ends of the respective curved piece portions 141 from the cylindrical piece portions 140.

The plurality of taper piece portions 139 are located in a common taper plane so as to constitute a taper portion 143. The plurality of cylindrical piece portions 140 are located in a common cylindrical plane so as to constitute an axially extending cylindrical portion 144. The plurality of engagement piece portions 142 are located in a common plane so as to constitute a flange portion 145 radially extending from the opening edge of the cylindrical portion 144. As shown in FIG. 11, the retainer 132 is coupled with the shaft member 133 at the connection hole 136. The primary piston spring 78 has one end engaged by the flange portion 145 constituted by the plurality of engagement piece portions 142.

Figure 13:
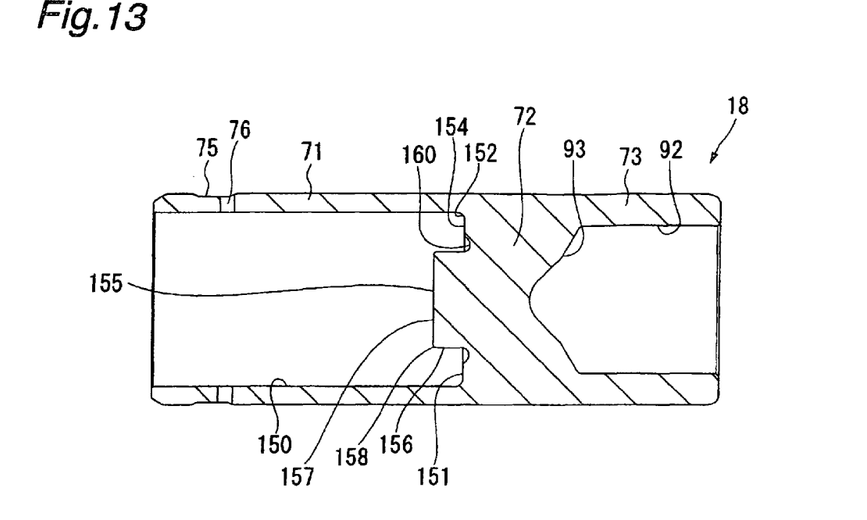
FIG. 13 is a longitudinal cross-sectional view of a primary piston of the master cylinder according to the third embodiment of the present invention.

As shown in FIG. 13, in the primary piston 18 of the third embodiment, an inner wall portion 150 on the inner surface side of the inner-side cylindrical portion 71, and an inner bottom portion 151 on the side of the inner-side cylindrical portion 71 of the bottom portion 72, in addition to the inner wall portion 92 on the inner surface side of the outer-side cylindrical portion 73 and the inner bottom portion 93 on the side of the outer-side cylindrical portion 73 of the bottom portion 72, are formed by the forging method, as in the first embodiment.

The inner wall portion 150 as the inner surface of the inner-side cylindrical portion 71 forms a cylinder extending along the axial direction of the primary piston 18 and having a certain diameter. An arcuate wall surface portion 152 having an arcuate shape in cross section along the axial direction of the primary piston 18 is formed at the end of the inner wall portion 150 on the inner bottom portion 151 side so as to connect the inner wall portion 150 and inner bottom portion 151.

A plane portion 154 is formed at the inner bottom portion 151 of the inner-side cylindrical portion 71. The plane portion 154 is adjacent to the opposite side of the arcuate wall surface portion 152 from the inner wall portion 150 side, and extends perpendicularly to the axis of the primary piston 18.

A protruding portion 155 is formed at the radial center of the inner bottom portion 151 so as to axially protrude from the plane portion 154. The protruding portion 155 comprises a cylindrical outer-circumferential-surface portion 156 extending in the axial direction of the primary piston 18 and having a certain diameter, a flat top surface portion 157 perpendicularly to the axis of the primary piston 18, and a chamfered corner portion 158 between the portions 156 and 157.

An annular groove 160 is formed at the inner bottom portion 151 of the primary piston 18 by the forging method. The annular groove 160 extends in the axial direction of the primary piston 18 from the outer-circumferential-surface portion 156 of the protruding portion 155, and is formed so as to be concaved toward the side of the outer-side cylindrical portion 73. That is, the annular groove 160 is formed at the inner circumferential end of the annular portion around the protruding portion 155 of the inner bottom portion 151.

Figure 14:
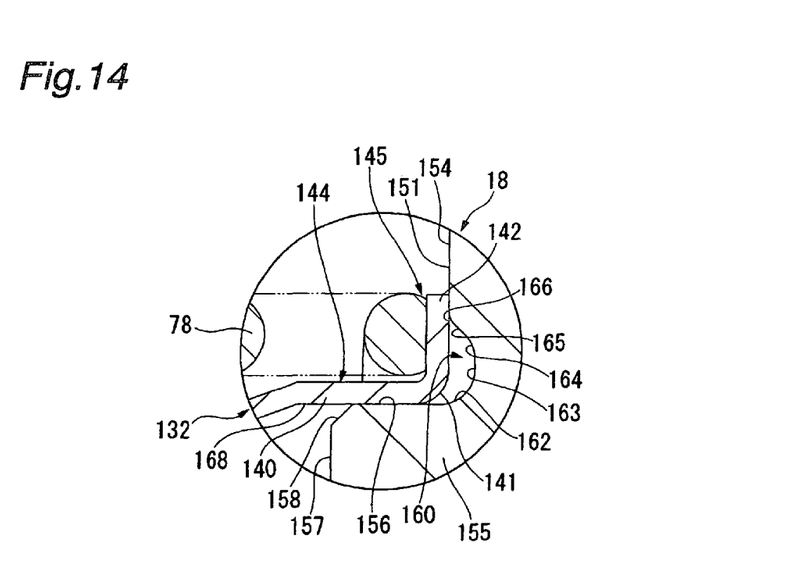
FIG. 14 is an expanded sectional view of essential portion B shown in FIG. 11, illustrating the master cylinder according to the third embodiment of the present invention.

As shown in FIG. 14, the annular groove 160 is adjacent to the outer-circumferential-surface portion 156. A radius of the arc of the annular groove 160 increases in proportion to an increase in the distance toward the axis of the primary piston 18 from the outer-circumferential-surface portion 156. The annular groove 160 includes an arcuate wall surface portion 162 and an annular flat groove bottom surface portion 163. The arcuate wall surface portion 162 has an arcuate shape in cross section along the axis direction of the primary piston 18. The groove bottom surface portion 163 is adjacent to the opposite side of the arcuate wall surface portion 162 from the outer-circumferential-surface portion 156, and extends from the arcuate wall surface portion 162 outwardly perpendicularly to the axis of the primary piston 18.

The annular groove 160 further includes an arcuate wall surface portion 164, a taper surface portion 165 and an arcuate corner portion 166. The arcuate wall surface portion 164 is adjacent to the outer end of the groove bottom surface portion 163, and extends toward the plane portion 154 so as to have an arcuate shape in cross section along the axial direction of the primary piston 18. The taper surface portion 165 is adjacent to the opposite side of the arcuate wall surface portion 164 from the groove bottom surface portion 163, and extends toward the plane portion 154 in a tapering manner. The arcuate corner portion 166 is adjacent to the opposite side of the taper surface portion 165 from the arcuate wall surface portion 164, and extends toward the plane portion 154 so as to have an arcuate shape in cross section along the axial direction of the primary piston 18. The plane portion 154 is adjacent to the opposite side of the arcuate corner portion 166 from the taper surface portion 165. The arcuate wall surface portion 162 is formed so as to draw an arc of a circle having a larger diameter than that of the curved piece portion 141 of the retainer 132 in cross section along the axial direction.

In the retainer 132 of the spring assembly 79, inner-circumferential-surface portions 168 of all of the cylindrical piece portions 140 constituting the cylindrical portion 144 simultaneously radially abut against the outer-circumferential-surface portion 156 of the protruding portion 155. As a result, a radial movement, i.e., a movement of the retainer 132 in the radial direction of the primary piston 18 is prevented, and the retainer 132 is fixed to the primary piston 18. That is, when the retainer 132 is fitted to the primary piston 18, all of the engagement piece portions 142 constituting the flange portion 145 abut against the plane portion 154 on the outer circumferential side of the inner bottom portion 151 relative to the annular groove 160, and the inner-circumferential-surface portions 168 of the plurality of cylindrical piece portions 140 constituting the cylindrical portion 144 abut against the outer-circumferential-surface portion 156 of the protruding portion 155.

The depth of the annular groove 160 formed so as to extend in the axial direction from the outer-circumferential-surface portion 156 of the protruding portion 155 is set such that the arcuate wall surface portion 162 on the outer circumferential side of the base end of the protruding portion 155 does not interfere with the retainer 132, and the flange portion 145 of the retainer 132 can abut against the plane portion 154. In this way, interference of the arcuate wall surface portion 162 on the outer circumferential side of the base end of the protruding portion 155 with the retainer 132 can be prevented which could otherwise occur due to formation of the inner bottom portion 151 by the forging method.

In particular, the depth of the annular groove 160 is set such that the arcuate wall surface portion 162 is overall located at a deeper position than the plane portion 154 in the axial direction of the primary piston 18. In other words, the depth of the annular groove 160 is set such that the distance in the axial direction of the primary piston 18 between the starting point of the arcuate wall surface portion 162 on the outer-circumferential-surface portion 156 side and the plane portion 154 is 0 or more.

Further, as mentioned above, the arcuate wall surface portion 162 is formed so as to draw an arc of a circle having a larger diameter than that of the curved piece portion 141 of the retainer 132 in cross section along the axial direction.

As a result, centering of the retainer 132 is achieved without interference of the arcuate wall surface portion 162 by abutment of the inner-circumferential-surface portion 168 of the cylindrical portion 144 against the outer-circumferential-surface portion 156 of the protruding portion 155. Then, the flange portion 145 of the retainer 132 abuts against the plane portion 154 formed on the outer circumferential side of the inner bottom portion 151 relative to the annular groove 160. That is, the flange portion 145 of the retainer 132 abuts against the annular portion around the protruding portion 155 of the inner bottom portion 151. Further, the center portion of the retainer 132 is the cylindrical portion 144, which extends in the opposite direction from the inner bottom portion 151, and of which inner surface side abuts against the outer surface side of the protruding portion 155.

According to the above-mentioned master cylinder 11 of the third embodiment, the axially extending annular groove 160 is formed at the primary piston 18 by the forging method, so as to extend from the outer-circumferential-surface portion 156 of the protruding portion 155 abutting against the retainer 132. As a result, the arcuate wall surface portion 162 is formed on the inner circumferential side of the annular groove 160 by the forging method, and the arcuate wall surface portion 162 can be located at a deeper position than the plane portion 154 of the inner bottom portion 151 serving as a seat surface of the retainer 132. Therefore, even through the primary piston 18 is formed by the forging method, it is possible to prevent axial interference of the protruding portion 155 with the retainer 132, and improve the seating performance of the retainer 132. Therefore, it is possible to keep an appropriate erecting position of the spring assembly 79, and securely obtain the excellent sliding performance of the primary piston 18. In addition, since the sliding performance is improved, it is possible to reduce damage to the primary piston 18 caused by pinching. Further, it is possible to prevent tilt of the spring assembly 79 in the axial direction of the primary piston 18, whereby it is possible to prevent tilt of the secondary piston 19, against which the spring assembly 79 abuts, in the axial direction of the cylinder body 15. Then, it is possible to keep an appropriate erecting position of the secondary piston 19, and securely obtain the excellent sliding performance of the secondary piston 19.

It should be noted that the shape of the annular groove 160 is not limited to the above mentioned embodiment, and may have any shape capable of improving the seating performance of the retainer 132 of the spring assembly 79, and may be changed according to a shape of a forging die. In the above-mentioned embodiment, the protruding portion 155 and the annular groove 160 is formed at the primary piston 18, but they may be formed at the secondary piston 19.

According to the above-mentioned embodiments, the excellent sliding performance of the piston can be securely obtained even though the piston is formed by the forging method.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2008-085068 filed on Mar. 28, 2008 and No. 2008-324145 filed on Dec. 19, 2008.

The entire disclosure of Japanese Patent Applications No. 2008-085068 filed on Mar. 28, 2008 and No. 2008-324145 filed on Dec. 19, 2008 including specifications, claims, drawings and summary are incorporated herein by reference in its entirety.

What is claimed is:

1. A master cylinder comprising:
a cylinder body having a bottomed cylindrical shape;
a piston slidably disposed in the cylinder body, and formed into a bottomed cylindrical shape; and
a spring assembly received in a cylindrical portion of the piston, the spring assembly comprising:
a spring for urging the piston toward an opening side of the cylinder body, and
a retainer adapted to restrict an extension length of the spring,
the piston comprising:
a limiting portion provided in the cylindrical portion of the piston for abutment against the retainer to limit a movement of the retainer in a radial direction of the piston; and
a bottom portion including:
an annular groove portion formed at the bottom portion of the piston so as to continuously extend from the limiting portion, and
a plane portion provided on an inner circumferential side relative to the annular groove portion, the retainer being capable of abutting against the plane portion.

2. The master cylinder according to claim 1, wherein the limiting portion is formed on an inner circumferential surface of the cylindrical portion of the piston, and the annular groove portion is formed at an outer circumferential end of the bottom portion.

3. The master cylinder according to claim 2, wherein the retainer includes:
a flat portion on an outer circumferential side thereof, the flat portion arranged to abut against the plane portion of the bottom portion; and
a space having a smaller dimension than half a diameter of a wire of the spring is generated between an outer circumferential surface of the flat portion and the inner circumferential surface of the cylindrical portion.

4. The master cylinder according to claim 3, wherein an outer circumferential surface of an end of the spring is tightly fitted to the inner circumferential surface of the cylindrical portion of the piston, whereby the retainer is retained in the piston.

5. The master cylinder according to claim 2, wherein the retainer includes:
a bent portion on an outer circumferential end thereof, the bent portion extending in an opposite direction from the bottom portion; and
the retainer arranged to abut against the plane portion of the bottom portion at a center side of the retainer relative to the bent portion.

6. The master cylinder according to claim 5, wherein an outer circumferential surface of the bent portion is tightly fitted to the inner circumferential surface of the cylindrical portion of the piston, whereby the retainer is retained in the piston.

7. The master cylinder according to claim 1, wherein the cylinder body includes a sliding portion at which the piston slides, and a large diameter portion which has a larger diameter than that of the sliding portion and is provided on a tip side of the piston.

8. A master cylinder comprising:
a cylinder body having a bottomed cylindrical shape;
a piston slidably disposed in the cylinder body and formed into a bottomed cylindrical shape by a forging method; and
a spring assembly received in a cylindrical portion of the piston, the spring assembly comprising:
a spring for urging the piston toward an opening side of the cylinder body, and
a retainer adapted to abut against a bottom portion of the piston, an extension length of the spring being restricted by the retainer,
the piston comprising:
a limiting portion provided in the cylindrical portion of the piston for abutment against the retainer to limit movement of the retainer in a radial direction of the piston, and
a protruding portion formed at a radial center of the bottom portion, wherein an outer circumferential surface of the protruding portion serves as the limiting portion; and
the annular groove portion is formed at an inner circumferential end of an annular portion other than the protruding portion by the forging method so as to continuously extend from the protruding portion, and
the retainer is capable of abutting against a plane portion of the bottom portion other than a protruding portion and the annular groove portion.

9. The master cylinder according to claim 8, wherein the retainer includes:
a flat portion on an outer circumferential side thereof, the flat portion being capable of abutting against the plane portion of the bottom portion; and
a cylindrical portion at the center side thereof, the cylindrical portion extending in an opposite direction from the bottom portion and abutting against the outer circumferential side of the protruding portion at an inner circumferential side of the cylindrical portion.

10. A master cylinder, comprising:
a cylinder body formed into a bottomed cylindrical shape, the cylinder body including a seal groove containing a seal for defining a pressure chamber in the cylinder body;
a piston formed into a bottomed cylindrical shape by a forging method, the piston arranged to abut against the seal at an outer circumferential surface of the piston, and being slidably disposed in the cylinder body; and
a spring assembly received in a cylindrical portion of the piston, the spring assembly comprising:
a spring for urging the piston toward an opening side of the cylinder body; and
a retainer adapted to abut against a bottom portion of the piston, an extension length of the spring being restricted by the retainer,
the piston comprising:
a limiting portion provided on an inner circumferential surface of a cylindrical portion of the piston for abutment against the retainer to limit a movement of the retainer in a radial direction of the piston; and
an annular groove portion formed at an outer circumferential end of the bottom portion of the piston by the forging method so as to continuously extend from the limiting portion,
the retainer adapted to abut against a plane portion of the bottom portion which is provided on an inner circumferential side relative to the annular groove portion of the bottom portion.

11. The master cylinder according to claim 10, wherein the retainer includes:

a flat portion on an outer circumferential side thereof, the flat portion arranged to abut against the plane portion of the bottom portion; and a space having a smaller dimension than half a diameter of a wire of the spring is generated between an outer circumferential surface of the flat portion and the inner circumferential surface of the cylindrical portion.

12. The master cylinder according to claim 11, wherein an outer circumferential surface of an end of the spring is tightly fitted to the inner circumferential surface of the cylindrical portion of the piston, whereby the retainer is retained in the piston.

13. The master cylinder according to claim 10, wherein the cylinder body includes:

a sliding portion which is provided on the opening side of the cylinder relative to the seal groove and at which the piston slides; and a large diameter portion which has a larger diameter than that of the sliding portion and which is provided on a tip side of the piston.

14. A master cylinder comprising:

a reservoir containing brake fluid;

a cylinder body formed into a bottomed cylindrical shape, the cylinder body including a seal groove containing a seal for separating the reservoir and a pressure chamber;

a pair of first and second pistons, each of which is formed into a bottomed cylindrical shape by a forging method, the first piston disposed on the opening side of the cylinder body and slidably dispoised in the cylinder body, the first piston adapted to abut against the seal at an outer circumferential surface of the first piston; and a spring assembly being received in a cylindrical portion of the first piston, the spring assembly comprising:

a spring for urging the first piston toward an opening side of the cylinder body;

a first retainer adapted to abut against a bottom portion of the first piston; and a second retainer adapted to abut against the second piston and being coupled with the first retainer so as to be relatively movable with respect to the first retainer, an extension length of the spring being limited by the first retainer and the second retainer, the first piston includes:

a limiting portion provided in the cylindrical portion of the first piston for abutment against the first retainer to limit a movement of the first retainer in a radial direction of the piston; and an annular groove portion formed at the bottom portion of the first piston by the forging method so as to continuously extend from the limiting portion, the first retainer being adapted to abut against a plane portion of the bottom portion which is formed on an inner circumferential side relative to the annular groove portion of the bottom portion.

15. The master cylinder according to claim 14, wherein the first retainer includes:

a flat portion on an outer circumferential side thereof, the flat portion adapted to abut against the plane portion of the bottom portion; and an extending portion at a center side thereof, the extending portion extending in an opposite direction from the bottom portion, the first retainer is coupled with the second retainer at the extending portion.

16. The master cylinder according to claim 15, wherein an outer circumferential surface of an end of the spring is adapted to abut against an inner circumferential surface of the cylindrical portion of the first piston, whereby the first retainer is retained in the first piston.

17. The master cylinder according to claim 14, wherein the cylinder body includes:

a sliding portion disposed on the opening side of the cylinder relative to the seal groove and at which the first piston slides; and a large diameter portion which has a larger diameter than that of the sliding portion and which is provided on a tip side of the first piston disposed on the opening side.

\* \* \* \* \*